Patented Jan. 16, 1923.

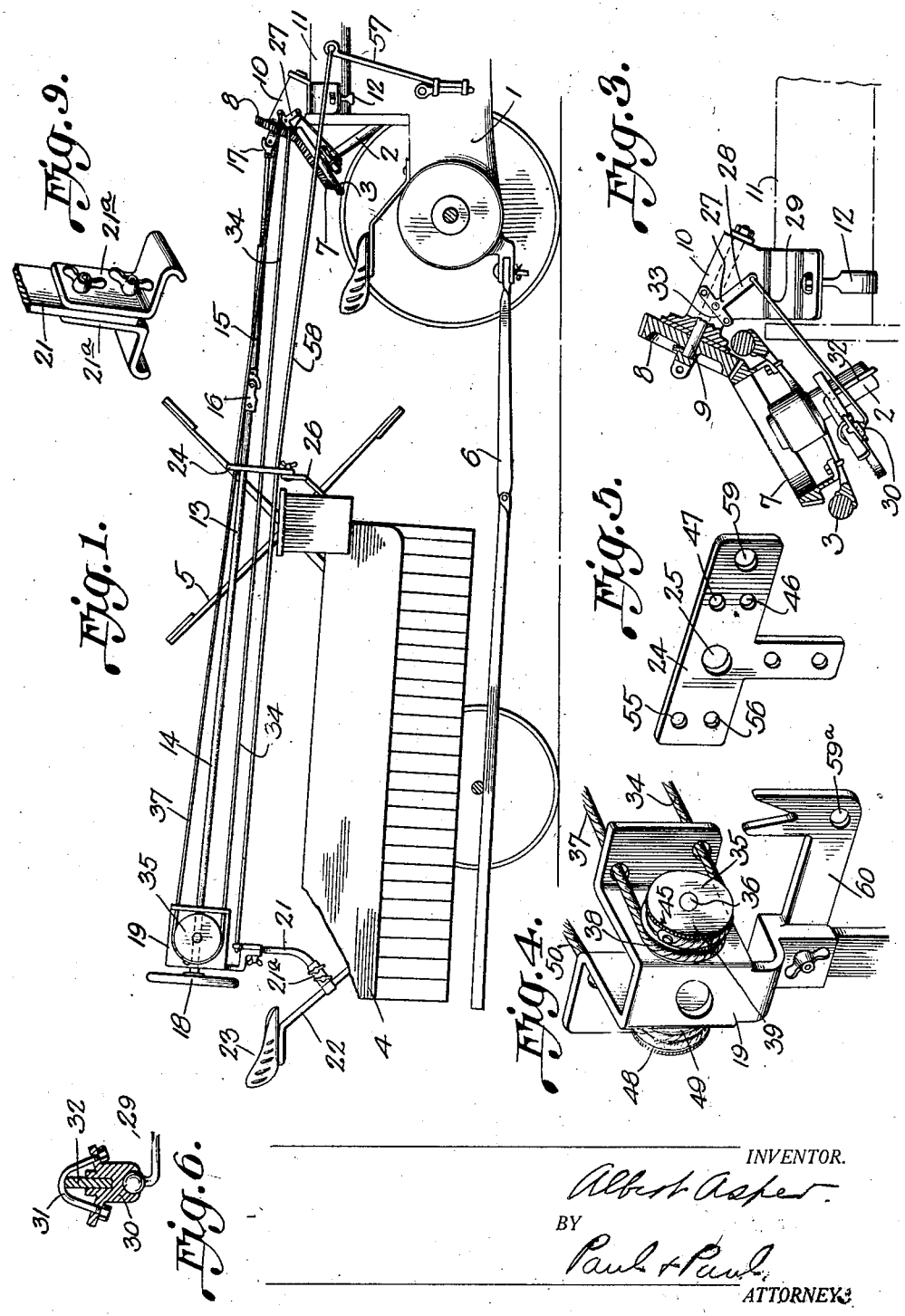

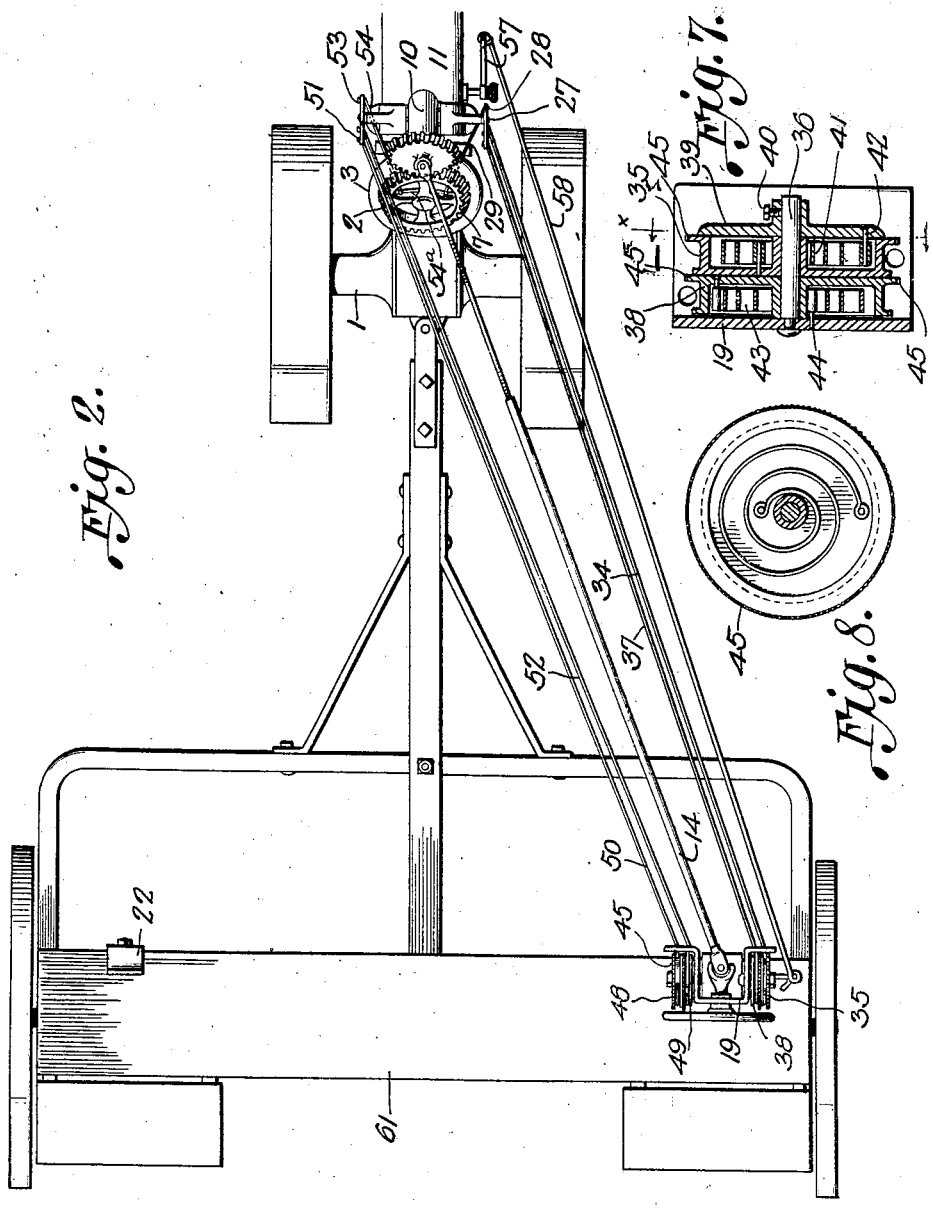

1,442,114

UNITED STATES PATENT OFFICE.

ALBERT ASPER, OF PARSHALL, NORTH DAKOTA.

TRACTOR CONTROL ATTACHMENT.

Application filed March 6, 1920. Serial No. 363,674.

*To all whom it may concern:*

Be it known that I, ALBERT ASPER, citizen of the United States, residing at Parshall, in the county of Mountrail and State of North Dakota, have invented certain new and useful Improvements in Tractor Control Attachments; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to tractor control attachments connecting a tractor to a binder or other agricultural or farm implement by which the tractor is guided by suitable means within reach of the operator seated on the farm implement, and the supply of fuel to the engine and the sparking device of the engine are likewise under control of the operator seated on the farm implement.

The invention has for its object to provide a construction in which the parts of the attachment can be readily connected in a practical way to the tractor and the farm implement, and provision be made for extension and contraction of the steering connection between the tractor and farm implement in making turns, and also for automatically taking up slack in the cables through which the fuel supply and the sparking are controlled.

To the accomplishment of the foregoing and such other objects as may hereinafter appear the invention consists in the features of construction and combination of elements hereinafter particularly described and then sought to be clearly defined by the claims, reference being had to the accompanying drawing forming a part hereof and in which—

Figure 1 is a side elevation of parts of a tractor and binder farm implement showing my invention applied;

Figure 2 is a plan view of the operating attachments illustrated in Figure 1, and showing part of a seed-drill substituted for the binder of Figure 1;

Figure 3 is an enlarged sectional detail of parts of the attachment connected to the tractor;

Figure 4 is an enlarged detail of parts of the attachment connected to the binder;

Figure 5 is a perspective of the guide for cables and steering connecting rod of the attachment;

Figure 6 is a detail sectional view of the throttle connection for supply of fuel to the engine;

Figure 7 is a cross section through the slack take-up device;

Figure 8 is a section on the line $x$—$x$ of Figure 7;

Figure 9 is a detail of clip-plates which attach a sheave bracket to a seat standard.

In the drawings the numeral 1 designates a part of an automobile or tractor of any approved type and construction, 2 the steering post and 3 the steering wheel; and 4 designates a part of a farm binder implement of any approved type with the reel 5 thereof; the tractor and binder being coupled one to the other by a suitable coupling bar 6.

To the wheel 3 of the steering post 2 is attached a gear 7 with which meshes a smaller gear or pinion 8 attached to spindle 9 journaled in a bracket 10 which straddles the engine gas tank 11 of the tractor and is held thereto by the strap 12, or is otherwise attached. A steering rod 13 formed of sections 14 and 15 connected by a universal knuckle 16, and having the section 15 preferably formed of two parts, one telescoping in the other as shown, is attached at one end by a universal or knuckle joint 17 to the gear or pinion 8 and at the other end to a hand wheel 18 at which end the steering rod is journaled in a bracket 19 which is suitably supported from the farm implement on a part thereof, preferably by a post or arm 21 held by clip-plates 21ª to the standard 22 of the driver's seat 23. By turning the wheel 18 the pinion 8 will be turned through the steering rod and transmitting motion to the gear 7 will operate the steering post of the tractor so that the tractor will be turned one way or the other as desired and in turning the telescoping section of the connecting steering rod will extend or contract proportionately to the arc of the turn. The connecting rod 13 may be sustained and guided by an intermediate bracket 24 through an opening 25 in which the rod will freely turn, this bracket-guide being connected to an arm 26 connected to the farm implement, or being otherwise supported.

A forked lever 27 is fulcrumed to a suitable support, say to the saddle 10, and its long arm 28 is connected by a link 29 to a ball-socket casting 30 connected by a clip 31, or otherwise, to the lever 32 which connects with the throttle that controls the supply and cut-off of fuel of the engine. One of the short arms 33 of this lever 27 is connected by a flexible cable 34 to a sheave 35 loosely mounted on a shaft or spindle 36, and the other short arm of the lever is connected by another flexible cable 37 to a sheave 38 also loosely mounted on the spindle 36 alongside the sheave 35. The outer open face of sheave 35 is closed by a plate 39 held in a fixed position to the spindle 36 by a set screw 40, and the outer open face of the sheave 38 is closed by a side wall of bracket 19 against which it fits. The sheave 35 contains a spiral spring 41 one end of which is attached by a pin 42 to the fixed face plate 39 and the other end to the sheave. The other sheave 38 contains a spiral spring 43 one end of which is attached by a pin 44 to the side wall of bracket 19 and the other end to the sheave. The springs are so placed in their respective sheaves that when one cable is slacked on the side towards which the tractor is turned the slack is taken up by the spring turning the sheave in the direction to wind up the cable, and when the tractor is turned in the opposite direction the slack in the cable on that side will be taken up. In the manner described the slack in the two cables is automatically taken up and the cables thus always maintained taut. When it is desired to throw the throttle lever to supply or cut-off the supply of fuel to the engine the proper sheave is turned to pull on the cable leading to the short fork of the throttle lever which will push or pull the throttle connecting link in the direction necessary to shift the throttle lever 32 in the proper direction, the cable to the other sheave being paid out against the restraining tension of the spring of that sheave. To facilitate the turning of the sheaves by hand for shifting the position of the throttle the edge of each sheave may be milled or knuckled as shown at 45. These sheaves constitute a slack take-up for the two cables in turning the tractor and also in shifting the throttle lever. One of the cables passes through an opening 46 in the guide-plate or bracket 24, and the other through an opening 47 in the same guide-plate and by this means the cables are supported between their opposite ends.

Two other sheaves 48 and 49 formed and supported as and in the manner described for sheaves 35 and 38 and therefore not requiring further detailed description, are connected one by a cable 50 to one short arm of a forked lever 51 and the other 52 to the other short arm of said lever, the long arm 53 of said lever being connected to a link or lever 54 which will connect with the lever 54ª of the sparking device (not shown) of the engine. The sparking device can thus be manipulated at will through the instrumentality of the cables, sheaves and forked sparking lever, the operation and functioning of the parts being practically the same as described for the throttle operating devices, and therefore need not be described in more detail. The cables 50 and 52 will pass through openings 55 and 56, respectively, in the guide-plate or bracket 24.

The clutch for the tractor is operated through a lever 57 which is connected by a cable 58 that passes through an opening 59 in the guide-bracket 24 and at its other end passes through an opening 59ª and then fastened to the notched arm 60 extending from the bracket 19.

In Figure 2 of the drawing I have shown the same attachment as that described for Figure 1 used in a seed drill instead of in connection with a binder. The seed drill is indicated in a general way by the numeral 61 and will be coupled in any suitable manner to the tractor. The bracket 19 which carries the sheaves 35, 38, 48 and 49 will be supported from one side or the other of the drill as occasion or necessity may require in any suitable manner. The saddle which carries the spindle of the pinion that meshes with the steering post gear and other features described for Figure 1 will be attached and operate in the same manner as described for the binder. In the case of the seed drill however the steeing rod 14 may have the coupling knuckle 16 changed nearer to the steering wheel 18.

I have illustrated and described with particularity the preferred details of construction but changes can be made therein and essential features retained.

The control attachment can be readily applied to different types of tractors and farm implements already in use; and the various parts can be made at comparatively little cost, and when applied serve in a very efficient manner the purposes for which designed.

It will be observed that the throttle that controls the supply of fuel to the motor, and the sparking-device which controls the ignition of the fuel, either or both, is operable through the means described, and that the pair of levers each connected to its respective operable part of the motor makes it possible for both the fuel supply and sparking device to be operated as one or the other may be selected.

Having described my invention and set forth its merits what I claim is:

1. An attachment for a tractor and farm implement, comprising a lever and means for connecting it with an operative control-part of the tractor-motor, cables for operating said lever, and slack take-ups connected one with each cable and operating to take-up slack in the cable.

2. An attachment for a tractor and farm implement, comprising a pair of levers, means for connecting one lever with the throttle of the tractor, means for connecting the other lever with the sparking-device of the tractor, and a slack take-up connected with the cables of both levers and operating to take-up the slack in the cable of each lever.

3. An attachment for a tractor and farm implement, comprising a lever and means for connecting it with an operative control-part of the tractor-motor, a pair of spring tension sheaves supported from a part of the farm implement, and a cable leading from each sheave to said lever, each sheave serving to take-up slack in the cable connected thereto.

4. An attachment for a tractor and farm implement, comprising a pair of levers, one having means for connecting it with the throttle of the tractor and the other means for connecting it with the sparking-device, two sets of spring-tension sheaves, a bracket in which said sheaves are supported, said bracket being connected with a part of the farm implement, and cables leading from each sheave of the two sets of sheaves, the cables from one set of sheaves being connected with one of said levers and the cables of the other set with the other lever, said sheaves serving as slack take-up in the cables leading to the two levers.

5. An attachment for a tractor and farm implement, comprising a forked lever fulcrumed to a part of the tractor, a link connected with one arm of said lever, a universal joint coupling between the other end of said link and a throttle lever, a cable extending from each of two other arms of the forked-lever, a pair of spring-tension slack take-up sheaves each of which has one of said cables connected thereto, and a bracket supporting said sheaves from a part of the farm implement.

In testimony whereof I affix my signature in presence of two witnesses.

ALBERT ASPER.

Witnesses:
  CHAS. S. HYER,
  WM. G. SHUDUSEN.